(12) United States Patent
Iantorno

(10) Patent No.: US 6,997,966 B2
(45) Date of Patent: Feb. 14, 2006

(54) LINT TRAP

(75) Inventor: Enzo Iantorno, Brampton (CA)

(73) Assignee: Airex Inc., Brampton (CA)

( * ) Notice: Subject to any disclaimer, the term of this patent is extended or adjusted under 35 U.S.C. 154(b) by 0 days.

(21) Appl. No.: 10/762,346

(22) Filed: Jan. 23, 2004

(65) Prior Publication Data

US 2005/0160708 A1    Jul. 28, 2005

(51) Int. Cl.
B01D 59/50     (2006.01)
F26B 11/04     (2006.01)

(52) U.S. Cl. .................. 55/385.1; 55/319; 55/410; 55/492; 55/495; 55/506; 55/511; 55/518; 34/92; 34/86; 34/89; 34/90; 34/133; 34/604

(58) Field of Classification Search .............. 55/385.1, 55/482, 410, 518, 319, 492, 495, 506, 511; 34/82, 86, 233, 235, 89, 90, 133, 604
See application file for complete search history.

(56) References Cited

U.S. PATENT DOCUMENTS

| | | | |
|---|---|---|---|
| 3,487,624 A | | 1/1970 | Tignanelli |
| 3,999,304 A | | 12/1976 | Doty |
| 4,227,315 A | * | 10/1980 | Hight ............................ 34/82 |
| 5,210,960 A | | 5/1993 | LaRue |
| 5,236,478 A | | 8/1993 | Lewis et al. |
| 5,664,339 A | | 9/1997 | Swanson et al. |
| 5,675,908 A | | 10/1997 | Barnes |
| 6,716,265 B1 | * | 4/2004 | Hung et al. ................... 55/473 |

* cited by examiner

Primary Examiner—Minh-Chau T. Pham
(74) Attorney, Agent, or Firm—Ogilvy Renault LLP; Paul J. Field

(57) ABSTRACT

A lint trap having an enclosure with an interior surface, an open end, with an inlet spaced from an outlet on the interior surface. A cover is removably mountable to the open end of the enclosure with a filter secured to the cover, where side edges of the filter slidably engage with the interior surface between the inlet and outlet.

6 Claims, 2 Drawing Sheets

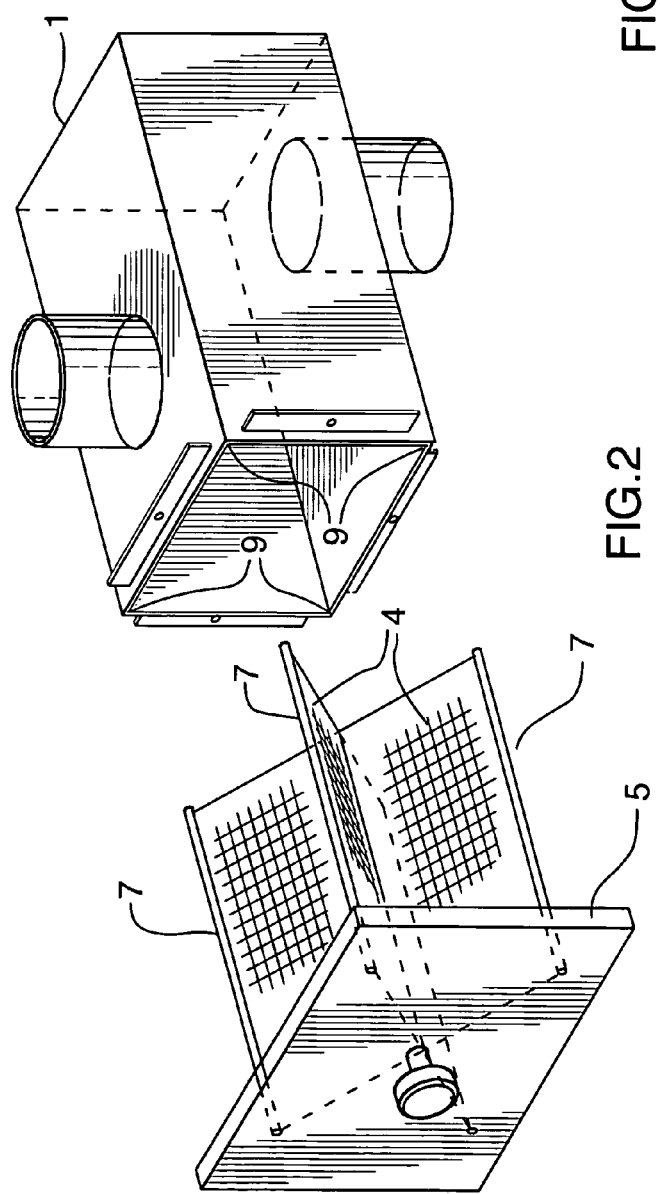
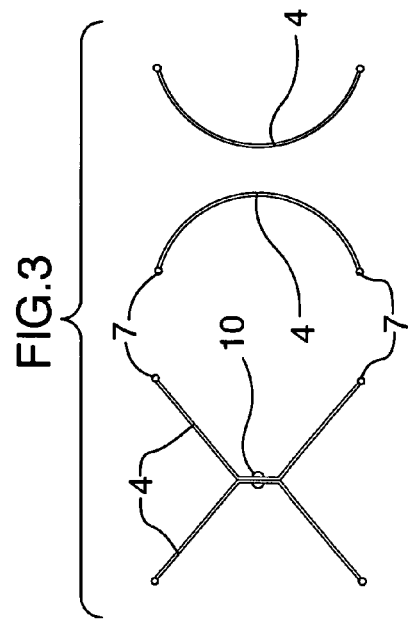
FIG. 2
FIG. 3

LINT TRAP

TECHNICAL FIELD

The invention relates to a lint trap for filtering lint from the exhaust of clothes dryer for example.

BACKGROUND OF THE ART

Cloth fibers or lint are released from clothing during a clothes drying operation. Generally, the clothes dryer has a built-in initial lint trap or filter that catches fibers as hot air is exhausted from the clothes dryer.

However significant amounts of lint fibers remain in the exhausted air and the prior art has provided several lint traps or filters external to the dryer in the exhaust holes to prevent build up of lint the exhaust holes and adjacent to its external outlet. Examples of external lint traps are shown in U.S. Pat. No. 3,999,304 to Doty, U.S. Pat. No. 3,487,624 to Tignanelli and U.S. Pat. No. 5,236,478 to Lewis et al.

Space consideration quite often rule out the use of external prior art lint trap devices since apartments, condominiums and homes must be configured to accommodate the space required by such external units and to provide convenient access for cleaning filters or lint traps of the accumulated lint. There is seldom excess space available and so the conventional external lint traps are of limited usefulness.

The present invention to provides a lint trap that may be housed within the wall or ceiling of a building adjacent to a clothes dryer.

The invention provides a lint trap that is easily accessed for cleaning and is of simple economical construction.

Further features of the invention will be apparent from review of the disclosure, drawings and description of the invention below.

DISCLOSURE OF THE INVENTION

The invention provides a lint trap having an enclosure with an interior surface, an open end, with an inlet spaced from an outlet on the interior surface. A cover is removably mountable to the open end of the enclosure with a filter secured to the cover, where side edges of the filter slidably engage with the interior surface between the inlet and outlet.

DESCRIPTION OF THE DRAWINGS

In order that the invention may be readily understood, one embodiment of the invention is illustrated by way of example in the accompanying drawings.

FIG. 2 is a like perspective view of a second embodiment showing two filter units comprising planar screens in an X-shaped assembly.

FIG. 3 shows two alternative cross-sections for creating an X-shaped assembly of two planar screens.

Further details of the invention and its advantages will be apparent from the detailed description included below.

DETAILED DESCRIPTION OF PREFERRED EMBODIMENTS

Figure 1:
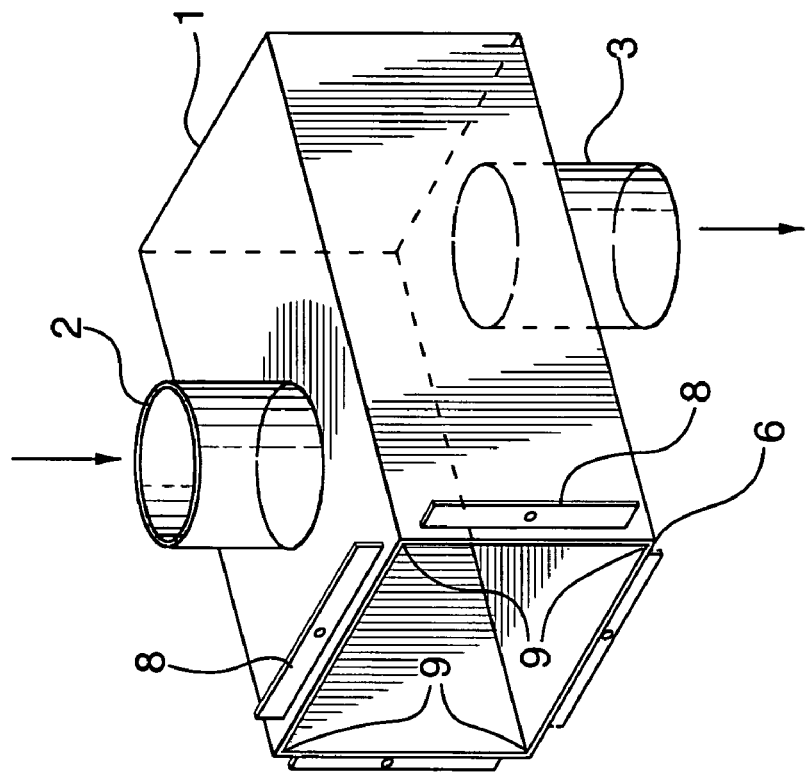
FIG. 1 is a perspective exploded view of a lint trap according to one embodiment of the invention including a generally rectangular enclosure box with inlet and outlet having a removable cover with a diagonally positioned filter screen that slides and frictionally engages the inside corners of the enclosure.
Figure 1:
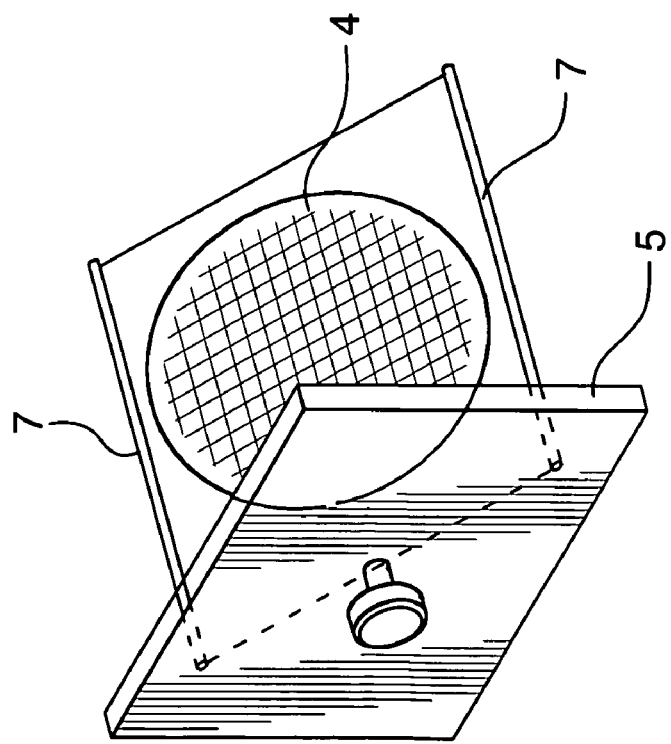

FIG. 1 shows a lint trap which in the embodiment shown comprises a rectangular prismatic sheet metal enclosure 1 having an interior surface for containing the airflow that is conducted through the enclosure 1 from the inlet 2 and exits the outlet 3 after passing through the filter 4.

A cover 5 is removably mounted to the open end 6 of the enclosure 1 and the filter 4 has a proximal end secured to the cover 5. As indicated in FIG. 1, the filter side edges 7 slidably engage with the interior surface, between the inlet 2 and outlet 3, to intercept any suspended lint fabrics in the exhaust air passing through the enclosure 1.

The filter 4 as illustrated in FIG. 1 can be a wire mesh mounted to a sheet metal plate that has a central opening over which the screen is positioned. This type of structure permits easy sliding removal and cleaning by the user.

Wall or ceiling mounting flanges 8 enable the enclosure 1 to be screwed through an opening in a building wall or a ceiling through which ducting for the dryer exhaust is passed to the enclosure 1. In this manner, the enclosure 1 can be hidden from view and conveniently housed in the ceiling or walls adjacent to the dryer in a building.

The filter 4 may have simple sheet metal side edges 7 that frictionally engage and slide into the inside corner 9 of the enclosure 1. For improved frictional engagement and sealing of the airflow to pass through the filter 4, the side edges 7 may include a flexible seal, such as a plastic or rubber bead.

In general, the lint fibers will cling to a screen or filter surface and gradually build up into a felt like layer that binds to the filter 4 as the air flow pushes the fibers against the filter 4. However, when the enclosure 1 is positioned within a ceiling for example, the mounting of the filter 4 on the cover 5 protects the user from lint particles that may fall downwardly upon them since the cover 5 acts as an overhead shield to catch falling lint particles.

FIG. 2 shows an alternative embodiment where the filter 4 comprises two planar screens disposed in an X-shape assembly. In this embodiment all four side edges 7 engage 4 inside the four corners 9 of the enclosure 1. The enclosure 1 may also be of cylindrical shape, hexagonal shape etc. FIG. 2 shows an X-shape planar screen which can be welded or brazed together at the intersection of the screens. FIG. 3 shows two alternative arrangements where a sheet metal screen is bent in a trapezoidal shape with a rivet 10 holding the two screens 4 together. Alternatively, the filters 4 can be formed in a U-shape positioned back to back in an X-shaped assembly with four side edges 7 positioned to engage the inside corners 9.

Although the above description relates to a specific preferred embodiment as presently contemplated by the inventor, it will be understood that the invention in its broad aspect includes mechanical and functional equivalents of the elements described herein.

I claim:

1. A lint trap comprising:
    an enclosure having an interior chamber defined by a plurality of unobstructed walls sealed together with at least two interior corners, an open end, with an inlet spaced from an outlet in communication with the interior chamber;
    a cover removably mountable to the open end of the enclosure; and
    a filter having a proximal end secured to the cover, and side edges slidably engagable with said at least two interior corners between the inlet and outlet.

2. The lint trap according to claim 1 wherein the side edges of the filter include a seal.

3. The lint trap according to claim 1 wherein the enclosure has a rectangular cross-section.

4. The lint trap according to claim 1 wherein filter comprises at least two planar screens.

5. The lint trap according to claim 4 wherein the planar screens are disposed in an X-shaped assembly.

6. The lint trap according to claim 1 wherein the enclosure includes mounting flanges adjacent the opening.

* * * * *